Oct. 6, 1953    D. J. FLYNN    2,654,289
APPARATUS FOR PRODUCING PHOTOMONTAGES
Filed Jan. 12, 1950    7 Sheets-Sheet 1

*INVENTOR.*
DENNIS J. FLYNN
BY
*Warren Kinney Jr.*
ATTORNEY

Oct. 6, 1953　　　　　　　　D. J. FLYNN　　　　　　　2,654,289
APPARATUS FOR PRODUCING PHOTOMONTAGES
Filed Jan. 12, 1950　　　　　　　　　　　　　　　　7 Sheets-Sheet 2

*INVENTOR.*
DENNIS J. FLYNN
BY
ATTORNEY

Oct. 6, 1953                    D. J. FLYNN                    2,654,289
                    APPARATUS FOR PRODUCING PHOTOMONTAGES
Filed Jan. 12, 1950                                        7 Sheets-Sheet 3

*INVENTOR.*
DENNIS J. FLYNN
BY
*J Warren Kinney Jr.*
ATTORNEY

Oct. 6, 1953 D. J. FLYNN 2,654,289
APPARATUS FOR PRODUCING PHOTOMONTAGES
Filed Jan. 12, 1950 7 Sheets-Sheet 5

Inventor
DENNIS J. FLYNN

By J. Warren Kinney, Jr.
Attorney

Oct. 6, 1953 D. J. FLYNN 2,654,289
APPARATUS FOR PRODUCING PHOTOMONTAGES
Filed Jan. 12, 1950 7 Sheets-Sheet 6

Inventor
DENNIS J. FLYNN
By J. Warren Kinney, Jr.
Attorney

Oct. 6, 1953     D. J. FLYNN     2,654,289
APPARATUS FOR PRODUCING PHOTOMONTAGES
Filed Jan. 12, 1950     7 Sheets-Sheet 7

Inventor
DENNIS J. FLYNN
By J. Warren Kinney, Jr.
Attorney

Patented Oct. 6, 1953

2,654,289

UNITED STATES PATENT OFFICE 2,654,289

APPARATUS FOR PRODUCING PHOTOMONTAGES

Dennis J. Flynn, Newport, Ky.

Application January 12, 1950, Serial No. 138,244

2 Claims. (Cl. 88—24)

This invention relates to a means for producing a photo-montage.

An object of the invention is to provide simple, inexpensive, yet highly efficient means for enabling amateurs to produce professional looking multi-picture photo-montages in less than one-half hour, in contrast to the six or seven hours presently required by professionals in producing five-picture photo-montages from a plurality of different negatives which, when projected, are printed onto a single composite print characterized by the absence of separation lines where the individual pictures meet.

A further object of the invention is to provide a kit which includes all of those various items necessary to enable professional looking multi-picture photo-montages to be prepared by amateur photographers.

Still another object of the invention is to provide a device useful in preparing multi-picture photo-montages which include a series of correlated masking elements which are so constructed and arranged and which are operatively associated with other elements of the device for insuring professional blending of the adjacent portions of adjoining pictures which collectively comprise the multi-picture item.

These and other objects are attained by the means described herein and as disclosed in the accompanying drawings in which.

Figure 22:
Fig. 22 is a reproduction of a photo-montage, made in accordance with the teachings of the present invention.

With reference to Fig. 22, it will be noted that the term "photo-montage" as used herein, and as understood by those versed in the art, refers to a single photographic print 110, the subject matter of which comprises a plurality of prints or partial prints, each of which may be from a different negative.

In order to successfully produce photo-montages, one of the major obstacles to be overcome is the elimination of separation lines where the individual pictures, which collectively comprise the photo-montage, meet. My method and apparatus effectively eliminate this obstacle.

Figure 1:
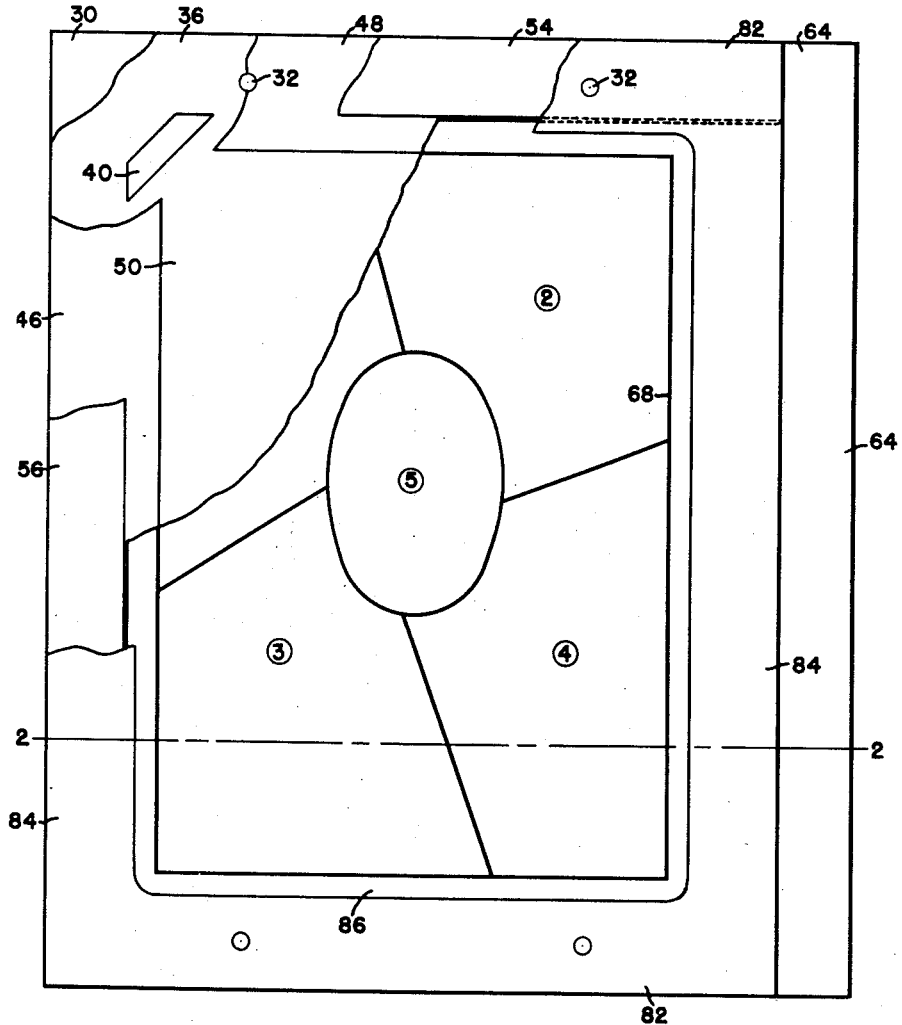
Fig. 1 is a plan view of part of the apparatus embodying the teachings of the present invention useful in producing a multi-picture photo-montage, parts thereof having been cut away for clarity of detail.
Figure 2:
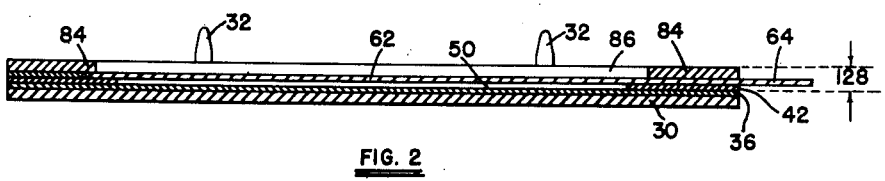
Fig. 2 is a sectional view taken on line 2—2 of Fig. 1.
Figures 7, 8:
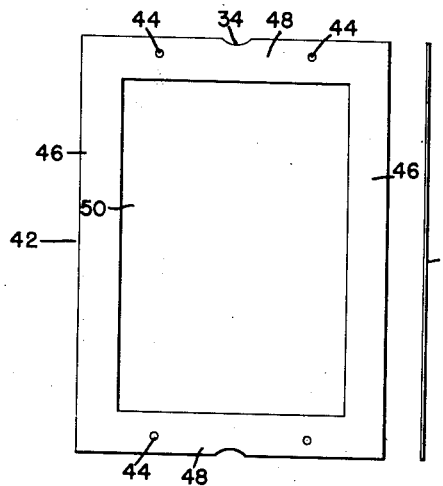
Fig. 7 is a plan view of a paper mask comprising a detail of the invention.
Fig. 8 is a side view of the mask of Fig. 7.
Figures 3, 4:
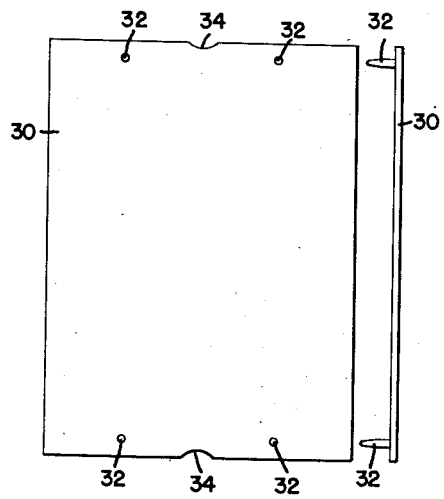
Fig. 3 is a plan view of baseboard comprising a detail of the present invention.
Fig. 4 is a side view of the baseboard of Fig. 3.
Figures 13, 14:
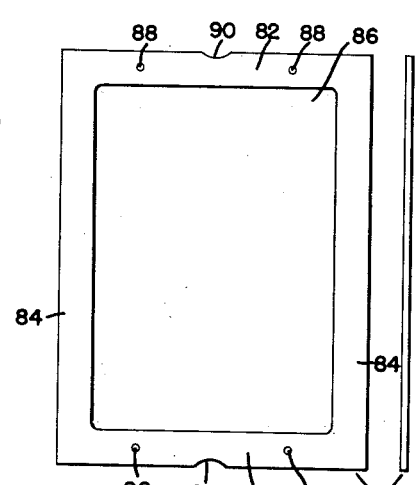
Fig. 13 is a plan view of a locking board comprising a detail of the present invention.
Fig. 14 is a side view of the locking board of Fig. 13.

With reference now to Figs. 1 and 2, it will be noted that a satisfactory device for practicing the invention may comprise a baseboard or support 30, which as clearly disclosed in Figs. 3 and 4, may be rectangular in form and fabricated from a single piece of sheet material such as, by way of example, cardboard, wood, composition board, plastic, metal, or the like. A plurality of pins, or pegs, 32 are secured to and carried by the baseboard, said pins projecting forwardly from one face thereof, being disposed adjacent the end edges of the board, as illustrated.

Preferably, though not necessarily, recessed or cut away finger portions 34 may be provided in the end edges of the baseboard.

Figures 5, 6:
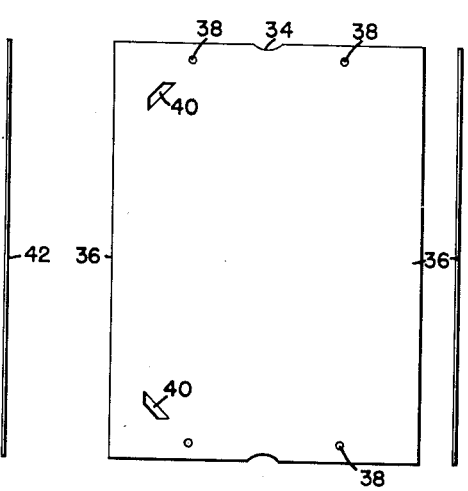
Fig. 5 is a plan view of a paper easel comprising a detail of the present invention.
Fig. 6 is a side view of the easel of Fig. 5.

A paper easel 36, Figs. 5 and 6, fabricated from any suitable sheet material, such as cardboard or the like, is provided wherein the dimensional characteristics of the easel are similar to those of the baseboard 30. As best disclosed in Fig. 5, apertures 38 are provided in the end adjacent portions of the easel, said apertures being constructed and arranged whereby to receive and fit over the pegs or pins 32 of the baseboard.

A pair of slots 40 may be provided in easel 36, said slots constructed and arranged whereby to facilitate introduction of the corner edge of a sheet of sensitized photographic material laid upon the easel. These slots facilitate mounting of the sheet of sensitized paper without resorting to the use of staples, adhesives, or other similar expedients known to those practicing the photographic arts.

A margin mask, denoted generally by the numeral 42, may be fabricated from material similar to that used in fabricating the paper easel. The margin mask is provided with apertures 44, which are complementary in all respects to apertures 38 of the paper easel. The margin mask includes a central open window portion 50 defined by pairs of side and end portions 46 and 48, respectively. Window 50 establishes the overall size of the photomontage which may be printed upon the sheet of sensitized paper mounted on the paper easel.

Figures 9, 10:
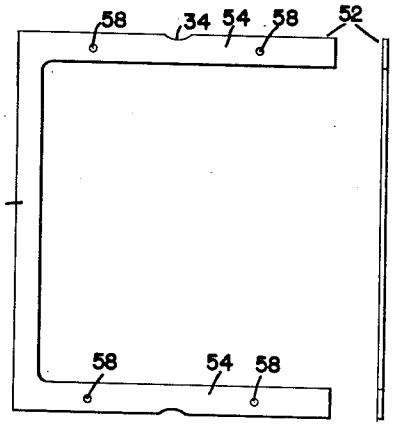
Fig. 9 is a plan view of a guide member comprising a detail of the present invention.
Fig. 10 is a side view of the guide member of Fig. 9.

A substantially U-shaped guide member denoted generally by the numeral 52 is fabricated from stock which is preferably about the thickness of the sheet material from which the paper easel and margin masks are fabricated. As clearly indicated in Fig. 9, the guide member includes a pair of laterally spaced end legs 54 interconnected along one edge by side leg 56. Apertures 58 are provided in end legs 54 for facilitating alignment and mounting of the shield member on pins 32 of the baseboard.

At this point it will be observed that the paper easel 36, margin mask 42 and guide member 52 are each provided with cut-out portions 34, which will be disposed in vertical alignment with similar portions 34 provided in baseboard 30 during those periods of time when items 36, 42 and 52 are mounted on pins 32.

A substantially T-shaped masking member or target shield, denoted generally by the numeral 60, may be fabricated from a single piece of sheet material having a thickness substantially equal to that from which guide member 52 is fabricated. This masking member or target shield comprises a main body portion 62 which is dimensioned to be received within the area defined by legs 54 and 56 of the U-shaped guide member 52, of Fig. 9. An end portion 64 is likewise provided, said end portion including an offset 66, the length of which may approximate the overall width of a leg 54 of the shield member.

A target area, the outer perimeter of which is indicated by the line 68, is provided on body portion 62, wherein the dimensional characteristics of perimeter 68 are such as to substantially coincide with the inner perimeter of aperture 50 of margin mask 42. The target area, as defined by lines 68, has in the example illustrated, been subdivided into five sectors or portions designated by the numerals 1, 2, 3, 4 and 5, respectively, by means of lines 70, 72, 74, 76 and 78, printed or otherwise produced on one face of body portion 62.

A locking board denoted generally by the numeral 80 may be fabricated from a sheet of material similar to that from which baseboard 30 is fabricated. The locking board comprises laterally spaced end and side legs 82 and 84, respectively, which define a central window portion 86, the area of which is preferably greater than the area of opening 50 in margin mask 42. Apertures 88 are provided in end legs 82 to receive pins 32 of the baseboard. Cutout thumb portions 90 are provided in the outer edges of end legs 82, wherein the location of thumb portions 90 is displaced with reference to thumb portions 34 of the baseboard for facilitating ease of removal of the locking board from pins 32.

With reference now to Figs. 15 through 19, it will be noted that each of the masking elements 102 is provided with a cut-out portion denoted generally by the numeral 100, which collectively define an area substantially equal to that of opening 50 provided in margin mask 42. Each of the various masking elements 102 is provided with a plurality of end adjacent apertures 104, the centers of which are substantially coincident with the centers of pins 32 of support or baseboard 30, however, the area of each of apertures 104 is substantially greater than the area of apertures 32, 38, 44, 58 and 88 of the paper easel, margin mask, guide member, and locking board, respectively, for a purpose hereinafter more fully explained.

With particular reference now to Figs. 15 through 19, it will be noted that those portions of the perimeter of each of cut-out portions 100 which define contiguous portions of adjoining target areas are serrated and complementary, whereby the sum total of cut-out portions 100 is substantially equal to the total target area of masking member 60.

It will likewise be observed that such contiguous portions are irregular and serrated. In the preferred embodiment of the invention those serrations are provided whereby to extend across corresponding target area defining lines, such as 70, 72, 74, 76 and 78.

In order to produce a photo-montage, a sheet of sensitized paper is mounted on paper easel 36, after which the margin mask 42 is positioned over the sheet of sensitized paper for defining the overall area or outline of the montage to be made, and for aiding in securing the sensitized paper in a flat condition against the easel.

The guide member is then mounted over pins 32 and secured in place by locking board 80.

Figures 11, 12:
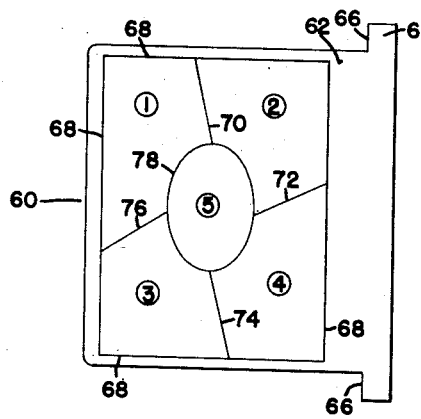
Fig. 11 is a plan view of a target shield comprising a detail of the invention.
Fig. 12 is a side view of the target shield of Fig. 11.

The masking member or target shield 60, Fig. 11, will, of course, be operatively associated with the guide member for precluding accidental or unintentional exposure of the sensitized paper whereby to provide the set-up illustrated in Fig. 1.

A selected negative or portion of a negative may then be properly focused and projected, by any suitable means not pertinent to the present invention, onto one of the target areas (1 to 5) of the target shield. After the image has been satisfactorily centered with reference to the selected target area and sharply focused thereon, the room may be darkened and a test strip of sensitized film laid over the selected target area for the purpose of enabling the operator to ascertain the correct "f stop" required for, say, a 20-second exposure.

It will be observed that this testing can be made without injurious effect to the sheet of sensitized paper mounted in easel 36 since the masking member or target shield will effectively preclude the passage of light thereto.

When the correct exposure time has been determined, that particular masking board which has an opening corresponding to the selected target area is laid upon the upper face of locking board 80 with apertures 104 engaging pins 32. The target shield 60 may then be withdrawn to the position illustrated in Fig. 21 for uncovering the sensitized paper beneath the selected target area.

Figure 21:
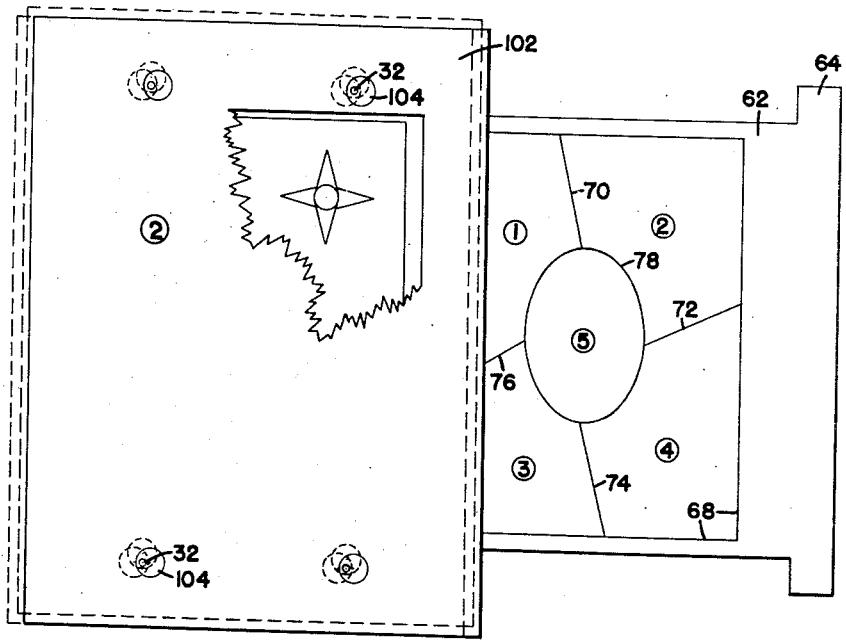
Fig. 21 is a plan view, similar to Fig. 1, but illustrating a masking board operatively associated therewith.
Figure 15:
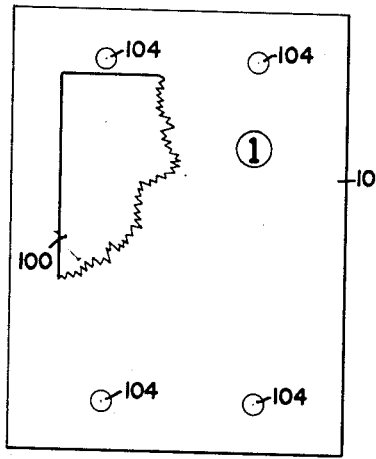
Figs. 15, 16, 17, 18 and 19 are plan views of a series of representative masking boards which collectively comprise a set.
Figure 16:
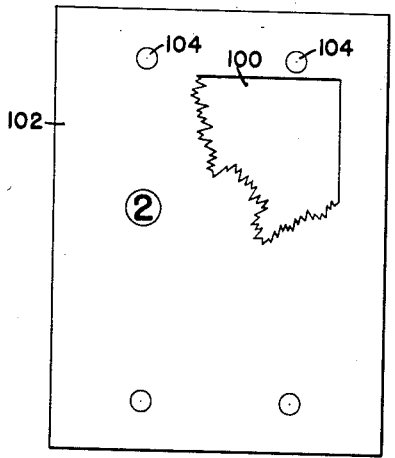
Figure 17:
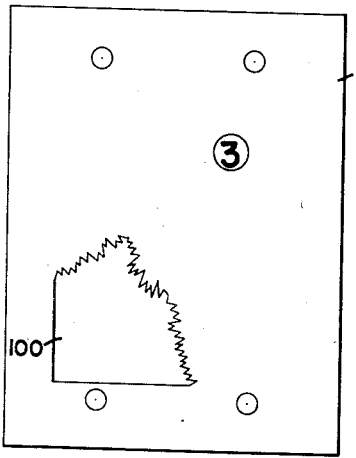
Figure 18:
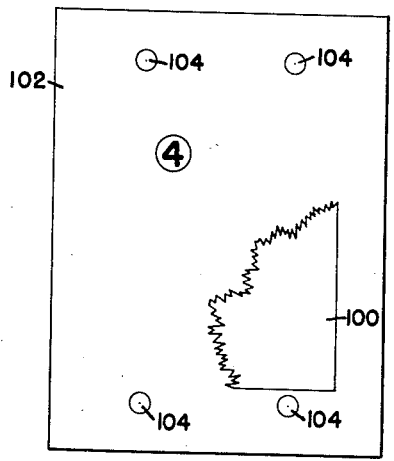
Figure 19:
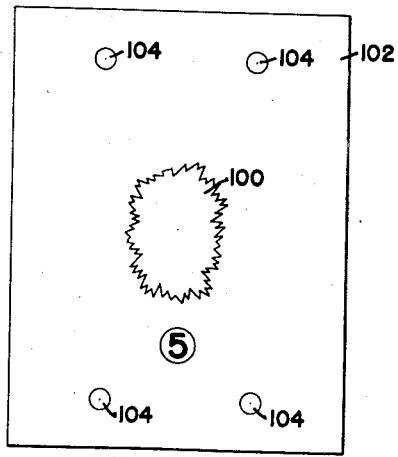
Figure 20:
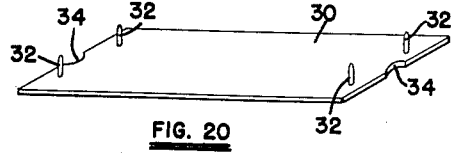
Fig. 20 is a prospective view of the baseboard of Figs. 3 and 4.

During those periods of time when a negative is being projected onto the sensitized paper, the masking board 102 is given a slow irregular oscillatory movement, see Fig. 21, as determined by the relationship between apertures 104 and pins 32. Preferably movement of the masking board 102 should be done without causing the perimeter of apertures 104 to engage pins 32. It will be noted that the masking board will be supported on and remain in contact with the upper face of the locking board during the entire period of time during which the sensitized paper is exposed, and while the board is being moved around on pins 32.

After the first negative has thus been projected onto the selected target area, the target shield 60 is slid back into place, to assume the relative position illustrated in Fig. 1, and the first masking board removed, after which another negative may be projected onto another target area.

The above procedure is repeated until all of the various target areas have been individually exposed for those periods of time necessary to insure proper and uniform development of each of the various projections which, when developed, will comprise the complete print. The sheet of sensitized paper may then be removed and developed in accordance with standard practice.

With particular reference now to Fig. 2, it will be noted that the lower face of each mask board 102 will be spaced from the upper sensitive side of a sheet of sensitized paper mounted in the easel, by a dimension indicated by the numeral 128. In this manner a certain amount of diffusion of the image-bearing projected-light will occur incident to exposure of various areas of the sensitized paper, which diffusion helps to materially reduce the formation of a sharp, well-defined edge to the particular negative being projected.

Figure 23:
Figs. 23 and 24 are reproductions of actual prints made during production of the photo-montage of Fig. 22, illustrating certain details in my technique of printing contiguous portions of individual pictures in such a manner as to effectively preclude the presence of separation lines where the various pictures meet.
Figure 24:

It will likewise be observed that the contiguous portions of target areas 100 have been provided with a zig-zag effect. Experimentation has indicated that such a zig-zag edge materially assists in reducing the formation of a sharp separation line between various pictures comprising the composite print, as will be evident from inspection of Figs. 23 and 24. In Fig. 23 target areas 1, 2 and 3 were exposed, and in Fig. 24 all of the target areas were exposed except central area 5. Study and comparison of Figs. 22, 23 and 24 will clearly illustrate the effectiveness of my method and device and will conclusively establish the absence of separation lines where the individual prints meet.

What is claimed is:

1. In a photo-montage printing apparatus the combination of a support for a sheet of sensitized material, a masking member having a plurality of target areas indicated thereon wherein the sum total of said target areas is substantially equal to the total area of the sheet of sensitized material to be printed, means for removably securing said masking member in overlapping relationship with a sheet of material mounted in said support, a plurality of masking elements of an area greater than the area of said masking member, each of said masking elements provided with an aperture corresponding to a different target area of said masking member, means individually and selectively engageable by said masking elements for disposing them in spaced parallelism with said support and beyond the plane of said masking member for correlating each masking element to that particular portion of a sheet mounted on said support disposed immediately below a corresponding target area, and for selectively exposing said sheet upon removal of said masking member from between said sheet and masking element.

2. In a photo-montage printing apparatus the combination of a support for a sheet of sensitized material, an overall masking member therefor having a plurality of target areas indicated thereon wherein the sum total of said target areas is substantially equal to the total area of the sheet of sensitized material to be printed, a plurality of partial masking elements of an area greater than the area of said masking member, each of said masking elements provided with an aperture corresponding to a particular target area of said masking member, means for correlating each masking element to that particular portion of a sensitized sheet disposed beneath said overall masking member which corresponds to a corresponding preselected target area on the upper face of said overall masking member, and means for locating said masking element in spaced parallelism with said sensitized sheet and for oscillatory movement relative thereto.

DENNIS J. FLYNN.

References Cited in the file of this patent

UNITED STATES PATENTS

| Number | Name | Date |
|---|---|---|
| 1,543,065 | Douglass | June 23, 1925 |
| 1,572,315 | Scholl | Feb. 9, 1926 |
| 1,813,436 | Bhosis | July 7, 1931 |
| 2,221,004 | Morris | Nov. 12, 1940 |
| 2,348,999 | Peterson | May 16, 1944 |
| 2,377,292 | Donaldson | May 29, 1944 |
| 2,412,288 | Pollack | Dec. 10, 1946 |

FOREIGN PATENTS

| Number | Country | Date |
|---|---|---|
| 1,009 | Great Britain | of 1865 |